Patented Aug. 11, 1931

1,818,117

UNITED STATES PATENT OFFICE

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY

WORKING SUBSTANCE FOR PRODUCING HEAT TRANSFORMING EFFECTS

No Drawing. Application filed Februray 23, 1927. Serial No. 170,427.

This invention relates to compositions of matter adapted for use industrially with particular relation to heat transforming systems, especially mechanically operated refrigerating outfits intended for domestic use. For outfits of the last named type it is especially desirable, if not imperative, that the composition of matter chosen as the working substance be of a harmless nature in order that the lives and health of householders may not be endangered in the event that the apparatus becomes defective. Hence, the purpose of the invention is to provide a non-explosive, non-inflammable, and non-corrosive composition of matter having sufficient volatility to adapt it for use as a refrigerant in heat-transforming systems.

In order to secure the required degree of volatility which will make my improved composition of matter suitable for refrigeration purposes generally, and domestic refrigeration in particular, I find it desirable to combine or to provide a solution of at least two ingredients or components. The selection is such that undesirable characteristics or properties of one component are overcome or neutralized by another component. In the present instance the factor of safety is of prime consideration in the selection of the major ingredient which must be sufficiently volatile to be practical but whose undesirable properties are such as to be capable of being neutralized without impairing the usefulness of the composition as a refrigerant. By preference the ingredients are taken from related halogenated hydrocarbon groups such as the chlorinated ethyl and chlorinated methyl derivatives. Dichloroethylene ($C_2H_2Cl_2$) and ethylidene chloride ($CH_3CHCl_2$) which are slightly inflammable have been found to be very satisfactory as the major ingredients and with them is combined a related halogenated hydrocarbon higher in halogen content, such as carbon tetrachloride ($CCl_4$). The combination of these ingredients results in a non-inflammable liquid. I find that about 6% of carbon tetrachloride is sufficient to render the composition non-inflammable although more may be used without raising the boiling point of the composition far above 60° C. which is the normal figure for ethylidene chloride.

I claim as my invention:

1. A non-flammable volatile liquid having a boiling point below 65° C. comprising an inflammable halogenated hydrocarbon together with a sufficient quantity of a related halogenated hydrocarbon of higher halogen content to render the composition non-flammable.

2. A liquid for use as a refrigerant having a boiling point below 65° C. containing dichloroethylene and having a non-flammable halogenated hydrocarbon in solution in sufficient amount to render the liquid non-flammable.

3. A refrigerant medium comprising an inflammable halogenated hydrocarbon and a sufficient quantity of carbon tetrachloride in solution therewith to render the medium non-flammable but not to raise its boiling point above 65° C.

4. A composition of matter adapted for use as a refrigerant medium comprising dichloroethylene and about 6 per cent of carbon tetrachloride.

Signed by me at Detroit, in the county of Wayne, and State of Michigan, this 14th day of February, 1927.

RANSOM W. DAVENPORT.